(12) United States Patent
Hong

(10) Patent No.: US 8,691,407 B2
(45) Date of Patent: Apr. 8, 2014

(54) BATTERY PACK

(75) Inventor: Sung-Ho Hong, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 188 days.

(21) Appl. No.: 13/067,641

(22) Filed: Jun. 16, 2011

(65) Prior Publication Data

US 2012/0129010 A1    May 24, 2012

(30) Foreign Application Priority Data

Nov. 19, 2010   (KR) .......................... 10-2010-0115562

(51) Int. Cl.
| | | |
|---|---|---|
| H01M 14/00 | (2006.01) | |
| B01J 19/12 | (2006.01) | |
| C25D 17/00 | (2006.01) | |
| H03K 3/45 | (2006.01) | |
| H03K 17/80 | (2006.01) | |
| H01R 13/66 | (2006.01) | |

(52) U.S. Cl.
USPC ............ 429/7; 29/623.1; 29/623.2; 29/623.4; 29/623.5; 204/193; 204/194; 327/510; 439/620.1; 439/620.5; 439/620.6; 439/620.12; 439/620.15

(58) Field of Classification Search
USPC ....................... 429/7; 204/193, 194; 327/510; 439/620.01, 620.05, 620.06, 620.12, 439/620.15; 29/623.1, 623.2, 623.4, 623.5
See application file for complete search history.

(56) References Cited

U.S. PATENT DOCUMENTS

| | | | |
|---|---|---|---|
| 6,724,170 B1 | 4/2004 | Maggert et al. | |
| 7,101,455 B1 * | 9/2006 | Hase et al. | 156/247 |
| 2006/0091858 A1 * | 5/2006 | Johnson et al. | 320/128 |
| 2010/0086841 A1 | 4/2010 | Moon | |
| 2010/0178547 A1 * | 7/2010 | Li | 429/151 |
| 2011/0223776 A1 * | 9/2011 | Ferber, Jr. | 439/39 |

FOREIGN PATENT DOCUMENTS

| | | | | |
|---|---|---|---|---|
| JP | H04-050313 | * | 2/1992 | ............... D01F 6/74 |
| JP | 2004-172116 A | | 6/2004 | |
| JP | 2006-100146 A | | 4/2006 | |
| JP | 2008-251472 A | | 10/2008 | |
| KR | 10-2008-0015156 A | | 2/2008 | |
| KR | 10-2009-0011602 A | | 2/2009 | |
| KR | 10 2010-0088030 A | | 8/2010 | |
| KR | 10-0995444 B1 | | 11/2010 | |

OTHER PUBLICATIONS

Southwest United Industries (Company literature © 2005 taken as Dec. 2005 {http://www.swunited.com/pro_plating_nic.htm}).*
Real Dictionary Along Princeton Univ Princeton NJ USA 2001—Available May 26, 2003.*
Falin Texas Inatruments Application Report Jun. 2003 slva139 {http://www.ti.com/lit/an/slva139/slva139.pdf}.*
Real Dictionary "May" Princeton Univ Princeton NJ USA 2001—Available May 26, 2003.*
Mouser Electronics "The Diode" {http://www.technologystudent.com/elec1/diode1.htm} c. Feb. 14, 2004 with Wayback machine evidence—{http://web.archive.org/web/*/http://www.technologystudent.com/elec1/diode1.htm}.*
Korean Office Action in KR 10-2010-0115562, dated Apr. 23, 2012 (Hong).
Korean Office Action in KR 10-2010-0115562, dated Sep. 8, 2011 (Hong).

* cited by examiner

*Primary Examiner* — Patrick Joesph Ryan
*Assistant Examiner* — Aaron Greso
(74) *Attorney, Agent, or Firm* — Lee & Morse, P.C.

(57) ABSTRACT

A battery pack includes at least one bare cell, a protection circuit module (PCM) external to the at least one bare cell, and at least one conductive tab connecting the bare cell to the PCM, the conductive tabs including a non-magnetic portion and a magnetic portion on a region of the non-magnetic portion.

19 Claims, 4 Drawing Sheets

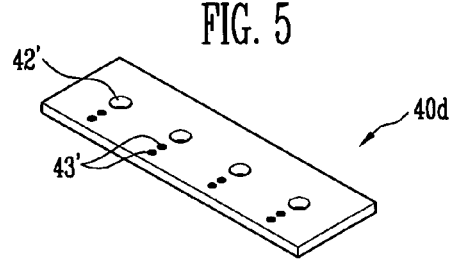
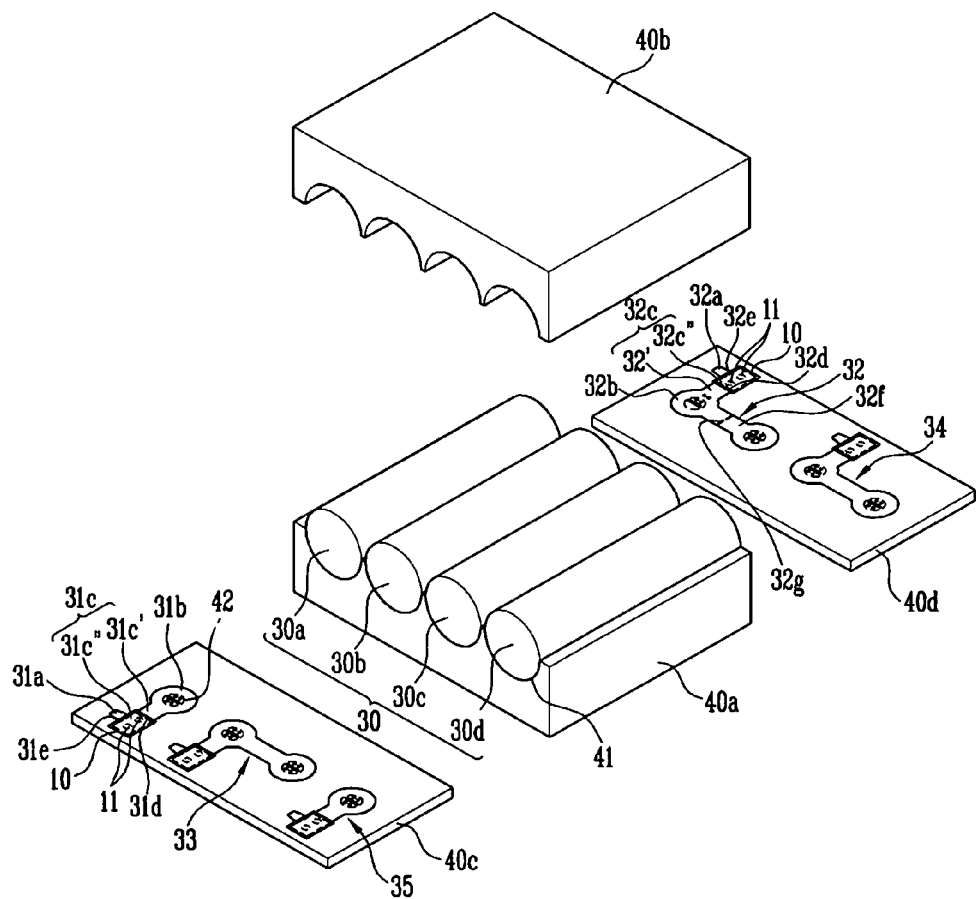

BATTERY PACK

BACKGROUND

1. Field

An aspect of example embodiments relates to a battery pack, and more particularly, to a battery pack having improved manufacturing workability.

2. Description of the Related Art

In general, e.g., in notebook computers or the like, it may be difficult to use only one bare cell as a power source. Therefore, a power supply apparatus employed, e.g., in notebook computers or the like, may be configured as a battery pack formed by connecting a plurality of bare cells in series and/or parallel so as to obtain a desired voltage and capacity. For example, the plurality of bare cells may be connected in series and/or parallel by welding, e.g., using conductive tabs.

SUMMARY

According to an aspect of example embodiments, there is provided a battery pack. The battery pack may include at least one bare cell, a protection circuit module (PCM) external to the at least one bare cell, and at least one conductive tab connecting the bare cell to the PCM, the conductive tabs including a non-magnetic portion and a magnetic portion on a region of the non-magnetic portion.

The conductive tab may include a first electrode portion connected to an electrode terminal of the bare cell, an extension portion extending from the first electrode portion to a sidewall of the bare cell, and a joint portion protruding from the extension portion to be connected to the PCM.

The magnetic portion may be on the extension portion, the magnetic portion being at a position corresponding to a magnetic substance in a jig for welding.

The magnetic portion may be at a center of the extension portion.

The extension portion may include an insulating member. The insulating member may cover the magnetic portion. The insulating member may include a polyimide (PI) film.

The extension portion may include a first region contacting the electrode terminal of the bare cell, a second region contacting the outer surface of the bare cell, and a first folding portion between the first and second regions.

The conductive tab may further include a second folding portion at a boundary between the extension portion and the joint portion.

The at least one bare cell may include at least two bare cells, and the at least one conductive tab may include a plurality of conductive tabs, the plurality of conductive tabs connecting the at least two bare cells therebetween and to the PCM.

At least one of the conductive tabs may further include a second electrode portion and a connection portion connecting the first and second electrode portions.

The at least one of the conductive tabs may further include a third folding portion in middle of the connection portion.

The non-magnetic portion of the conductive tab may include copper. The magnetic portion may be on the copper portion and may overlap a sidewall of the bare cell.

The magnetic portion may include a magnet or a metal piece on the copper portion. The metal piece may include pure iron or nickel.

According to an aspect of example embodiments, there is provided a method of forming a battery pack with at least one bare cell and a protection circuit module (PCM) external to the at least one bare cell. The method may include forming a plurality of conductive tabs the conductive tabs including a non-magnetic portion and a magnetic portion, the magnetic portion being on a region of the non-magnetic portion, and welding the conductive tabs to the bare cells, such that the conductive tabs connect the bare cell therebetween and to the PCM.

Forming the conductive tabs may include forming the magnetic portion by performing cladding with respect to the non-magnetic portion of the conductive tab.

Forming the conductive tabs may include adhering the magnetic portion to the non-magnetic portion of the conductive tab.

BRIEF DESCRIPTION OF THE DRAWINGS

The above and other features and advantages will become more apparent to those of ordinary skill in the art by describing in detail exemplary embodiments with reference to the attached drawings, in which:

FIG. 5 illustrates a partial perspective view of another embodiment of a jig for welding bare cells with conductive tabs according to an embodiment.

FIG. 6 illustrates an exploded perspective view of a jig with bare cells and conductive tabs according to an embodiment.

DETAILED DESCRIPTION

Figure 1:
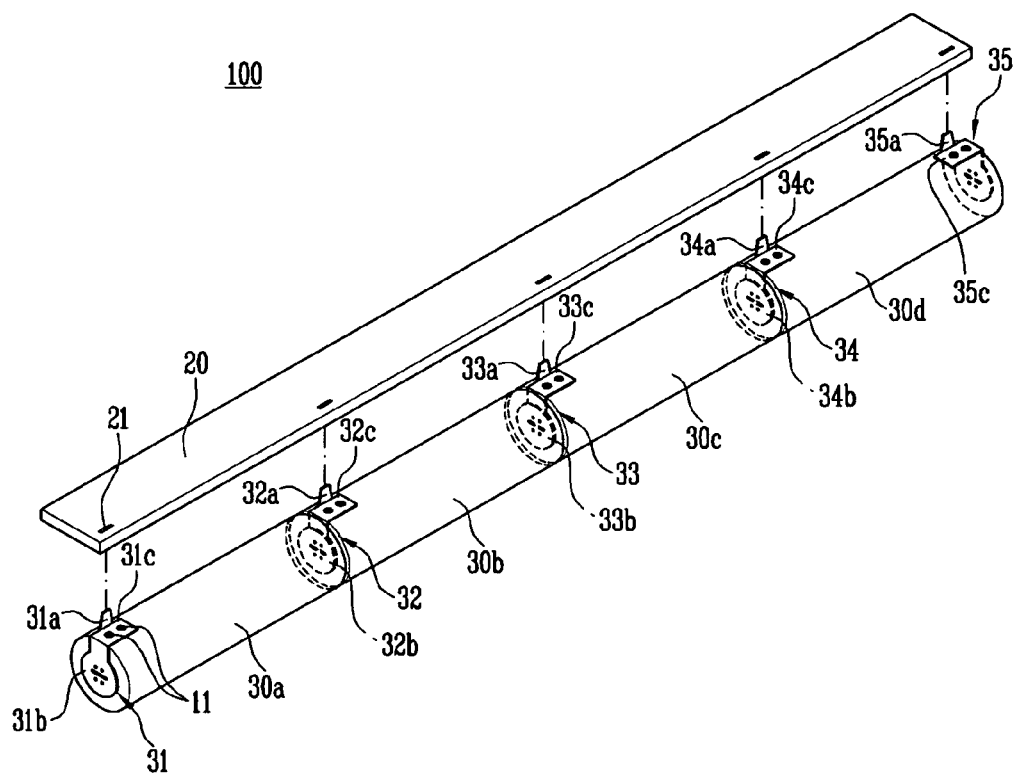
FIG. 1 illustrates a perspective view of a battery pack according to an embodiment.

Korean Patent Application No. 10-2010-0115562, filed on Nov. 19, 2010, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. Further, it will also be understood that when a layer is referred to as being "connected to" another layer, it can be directly connected to the other layer or one or more intervening layers may be interposed therebetween. In addition, it will also be understood that when a layer is referred to as being "between" two layers, it can be the only layer between the two layers, or one or more intervening layers may also be present. Like reference numerals refer to like elements throughout.

In general, when a battery pack is manufactured, welding of a plurality of bare cells and their corresponding conductive tabs may be performed by mounting the bare cells onto a jig. However, the conductive tabs may not be easily fixed to the plurality of respective bare cells, thereby reducing welding workability. Therefore, example embodiments of non-magnetic conductive tabs in the welding of battery cells will be described hereinafter in detail with reference to the accompanying drawings.

FIG. 1 illustrates a perspective view of a battery pack according to an embodiment. Referring to FIG. 1, a battery pack 100 according to an embodiment may include at least one bare cell connected to a circuit. For example, the battery pack 100 may include a plurality of bare cells 30, e.g., first through fourth bare cells 30a, 30b, 30c and 30d, connected to a protection circuit module (PCM) 20. The PCM may be positioned in a region at the outside of, i.e., external to, the plurality of bare cells 30. It is noted that, hereinafter, the bare cells will be commonly designated as 'bare cells 30', except for instances where an individual bare cell is described.

Referring back to FIG. 1, the battery pack may further include a plurality of conductive tabs corresponding to the plurality of bare cells, e.g., conductive tabs 31, 32, 33, 34, and 35, that electrically connect between adjacent bare cells 30 and that electrically connect the PCM 20 to the bare cells 30. That is, one side of each of the conductive tabs 31, 32, 33, 34, and 35 may be connected to a corresponding bare cell 30, and the other side of each of the conductive tabs 31, 32, 33, 34, and 35 may be connected to the PCM 20. In this instance, the conductive tabs 31, 32, 33, 34, and 35 may be formed of a non-magnetic material, e.g., copper (Cu).

In detail, the conductive tabs may include edge conductive tabs and middle conductive tabs. For example, the conductive tabs 31, 32, 33, 34, and 35 may be configured as edge conductive tabs 31 and 35 respectively positioned at end portions of outermost bare cells 30a and 30d, and as middle conductive tabs 32, 33, and 34 positioned between the bare cells 30. That is, as illustrated in FIG. 1, the conductive tabs 31 and 35 may be attached to respective outermost edges of the battery pack 100, i.e., outermost edges of respective bare cells 30a and 30d, and each of the conductive tabs 32, 33, and 34 may be positioned between two adjacent bare cells 30, i.e., bare cells 30a through 30d, to connect therebetween.

The conductive tabs 31 and 35 positioned at the end portions of the outermost bare cells 30a and 30d may include electrode portions 31b and 35b, extension portions 31c and 35c, and joint portions 31a and 35a, respectively. Like the conductive tabs 31 and 35, the conductive tabs 32, 33, and 34 positioned between the bare cells 30 may include electrode portions 32b, 33b, and 34b, extension portions 32c, 33c, and 34b, and joint portions 32a, 33a, and 34a. Further, the electrode portions 32b, 33b, and 34b may include connection portions and electrode portions connected to the connection portions, as will be described in more detail below with reference to FIG. 3.

As further illustrated in FIG. 1, each of the extension portions of the conductive tabs, e.g., each of the extension portions 31c, 32c, 33c, 34c, and 35c in respective conductive tabs 31, 32, 33, 34, and 35, may include a magnetic portion 11. An insulating member 10 (see FIG. 2) for covering the magnetic portion 11 may be attached to each of the extension portions 31c, 32c, 33c, 34c, and 35c in the conductive tabs 31, 32, 33, 34, and 35. Each of the joint portions 31a, 32a, 33a, 34a, and 35a may be a portion that is inserted into a corresponding insertion hole 21 in the PCM 20 and then fixed, e.g., through soldering.

In FIG. 1, the plurality of bare cells 30 is formed into a structure in which four bare cells 30a, 30b, 30c, and 30d are connected in series to one another. In this instance, the conductive tabs 32, 33, and 34 positioned between the plurality of bare cells 30 may be used as terminals for sensing, and the conductive tabs 31 and 35 respectively positioned at the outermost portions of the battery pack 100 may be used as large-current terminals in the implementation of the battery pack 100. As described above, the plurality of bare cells 30 may be electrically connected to one another by the conductive tabs 32, 33, and 34 positioned therebetween.

The PCM 20 may include a printed circuit board, electronic components mounted on the printed circuit board, and the like. The PCM 20 may control current by detecting overcharge or overdischarge of a battery, and the like.

Figure 2:
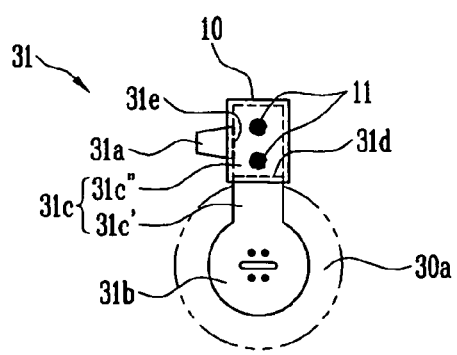
FIG. 2 illustrates an enlarged plan view of a conductive tab at an end portion of a bare cell according to an embodiment.

FIG. 2 illustrates an enlarged plan view of a conductive tab in a battery pack according to an embodiment. As an example, FIG. 2 will be described with reference to the conductive tab 31 positioned at an end portion of the bare cell 30a.

Referring to FIG. 2, the conductive tab 31 positioned at the end portion of the outermost bare cell 30a (see FIG. 1) may include an electrode portion 31b, an extension portion 31c, and a joint portion 31a. The electrode portion 31b may be connected to an electrode terminal of the bare cell 30a, and the extension portion 31c may extend from the electrode portion 31b to contact a region on a side of the bare cell 30a, e.g., a lateral sidewall of the bare cell 30a. The joint portion 31a may protrude from the extension portion 31c to be connected to the insertion hole 21 of the PCM 20 (see FIG. 1).

As illustrated in FIG. 2, the extension portion 31c may be divided into a first region 31c' that comes in contact with the electrode terminal of the bare cell 30a and a second region 31c" that comes in contact with the side of the bare cell 30a. For example, the first and second regions 31c' and 31c" may define opposite ends of the extension portion 31a, and may be connected to different parts of the bare cell 30a, e.g., electrode terminal and sidewall on different surfaces of the bare cell 30a. A boundary between the first and second regions 31c' and 31c" may be a first folding portion 31d formed to be foldable. A boundary between the extension portion 31c and the joint portion 31a may be a second folding portion 31e formed to be foldable. Thus, the outermost conductive tab 31 may be easily folded along an outer surface of the bare cell 30a by the first and second folding portions 31d and 31e. For example, the outermost conductive tab 31 may be easily folded along the first and second folding portions 31d and 31e to define three portions extending along three different surfaces perpendicular to each other.

As further illustrated in FIG. 2, the magnetic portion 11 is formed in the second region 31c" of the extension portion 31c, i.e., on one side of the conductive tab 31 contacting the sidewall of the bare cell 30a. The magnetic portion 11 is formed at a position corresponding to a magnetic substance on a jig used for welding the bare cell 30a and the conductive tab 31 in a welding operation, e.g., the magnetic portion 11 is formed only at positions of the conductive tab 31 overlapping the magnetic substance on the jig, as will be described in more detail below with reference to FIGS. 4-6. For example, the magnetic portion 11 may be formed at a center of the extension portion 31c, e.g., the magnetic portion 11 is formed only at a center of the second region 31c" of the extension portion 31c among portions of the conductive tab 31 to overlap the jig. Accordingly, it may be possible to improve rigidity, i.e., bending, of the conductive tab 31 and to prevent current from being concentrated on the magnetic portion 11.

The magnetic portion 11 may be formed of a magnetic material or a metal, e.g., pure iron (Fe) or nickel (Ni). The magnetic portion 11 may be formed by performing cladding or adhesion with respect to the outermost conductive tab 31. Here, "cladding" refers to bonding the magnetic portion 11 to the conductive tab 31 by simultaneously pressing and heating the magnetic portion 11, while "adhesion" refers to bonding the magnetic portion 11 to the conductive tab 31 by using an adhesive or an adhesive tape.

The conductive tab 31 may be formed, e.g., of copper (Cu). It is noted that using copper (Cu) to form the conductive tab 31 may improve conductivity and lower material costs of the conductive tab 31, e.g., as compared to a conductive tab formed of nickel (Ni). However, as copper (Cu) is non-magnetic, the magnetic portion 11 may be formed on the extension portion 31c of the non-magnetic conductive tab 31, i.e., the copper (Cu) conductive tab 31, in order to facilitate attachment of the non-magnetic conductive tab 31 to the magnetic substance on the jig during a welding operation of the conductive tab 31 and the bare cell 30a.

As discussed previously, the magnetic portion 11 may be formed on the conductive tab 31 at a position corresponding to the magnetic substance on the jig for welding, which connects the conductive tab 31 to the bare cell 30a. Accordingly, the welding may be performed while the magnetic portion 11 is attached to the magnetic substance of the jig for welding, thereby improving welding workability.

As illustrated in FIG. 2, the insulating member 10, e.g., a polyimide (PI) film, may be formed on the extension portion 31c that contacts the side of the bare cell 30a, i.e., to surround the second region 31c" of the extension portion 31c. After the magnetic portion 11 is provided to the extension portion 31c of the conductive tab 31, the insulating member 10 may be formed to cover the magnetic portion 11. Accordingly, the magnetic portion 11 may be more firmly attached to the conductive tab 31.

FIG. 2 illustrates the outermost conductive tab 31 of the bare cell 30a, i.e., positioned at the leftmost portion of the battery pack 100 in FIG. 1. However, the outermost conductive tab 35 of the bare cell 30d (see FIG. 1), i.e., positioned at the opposite side (the rightmost portion), may also be formed in the same shape and method as the outermost conductive tab 31 of the bare cell 30a.

Figure 3:
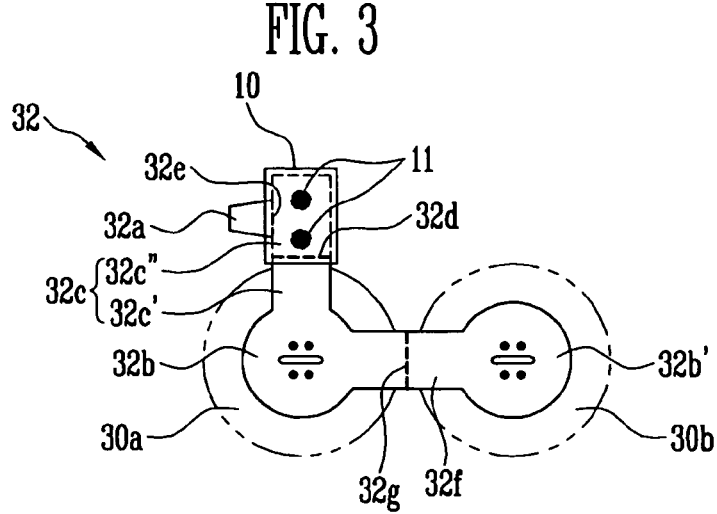
FIG. 3 illustrates an enlarged plan view of a conductive tab between bare cells according to an embodiment.

FIG. 3 illustrates a plan view of a conductive tab positioned between adjacent bare cells 30 according to an embodiment. In FIG. 3, the conductive tab 32 will be described as an example, and descriptions of components identical to those of FIG. 2 will be omitted.

Referring to FIG. 3, the conductive tab 32, i.e., a conductive tab positioned between bare cells 30a and 30b, may include a first electrode portion 32b connected to an electrode terminal of the bare cell 30, an extension portion 32c extending from the first electrode portion 32b to a region on the side of the bare cell 30, and a joint portion 32a protruding from the extension portion 32c to be connected to the PCM 20 (see FIG. 1).

Further, the conductive tab 32 may include a connection portion 32f and a second electrode portion 32b' connected to the connection portion 32f. For example, the first electrode portion 32b may be connected to the electrode terminal of the bare cell 30a, and the second electrode portion 32b' may be connected to an electrode terminal of the bare cell 30b, e.g., opposite to the bare cell 30a. A third folding portion 32g may be formed, e.g., in the middle of the connection portion 32f, between the first and second electrode portions 32b and 32b' to facilitate connection of the first and second electrode portions 32b and 32b' to terminals of adjacent bare cells 30. For example, when the bare cells 30a and 30b are aligned to have terminals thereof face each other, the conductive tab 32 may be folded along the third folding portion 32g to have the first and second electrode portions 32b and 32b' connected and opposite to each other, e.g., overlap each other and face respective terminals of bare cells 30a and 30b in a subsequent implementation of the battery pack 100.

Although the conductive tab 32 positioned between the two bare cells 30a and 30b among the plurality of bare cells 30 has been described in FIG. 3, the conductive tabs 33 and 34 positioned between another two bare cells 30b and 30c or 30c and 30d may also be formed in the same shape as the conductive tab 32 positioned between the two bare cells 30a and 30b.

Figure 4:
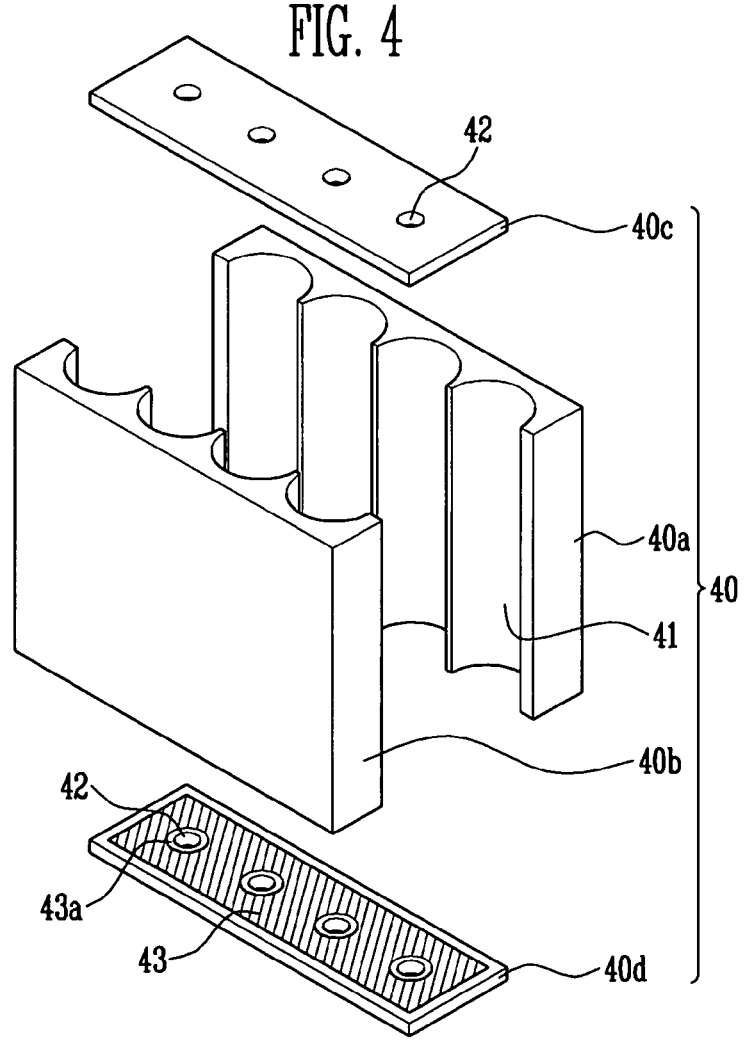
FIG. 4 illustrates an exploded perspective view of a jig for welding bare cells with conductive tabs according to an embodiment.

FIG. 4 illustrates an exploded perspective view of a jig for welding, which fixes bare cells and conductive tabs according to an embodiment. Referring to FIG. 4, a jig 40 for welding according to an embodiment may be used when conductive tabs are welded to electrode terminals of a plurality of bare cells in manufacturing a core pack configured as a plurality of, e.g., cylindrical batteries.

The jig 40 for welding may include first and second jig parts 40a and 40b positioned opposite each other. Each of the first and second jig parts 40a and 40b may include mounting grooves 41. For example, each of the first and second jig parts 40a and 40b may have a structure in which semi-circular inner surfaces are formed to correspond to outer surfaces of the cylindrical batteries, respectively.

Third and fourth jig parts 40c and 40d may be positioned on open surfaces of the first and second jig parts 40a and 40b, respectively. That is, first and second jig parts 40a and 40b may be positioned to face each other with the mounting grooves 41 therebetween, such that the mounting grooves 41 may define, e.g., circular, spaces for the bare cells 30. Further, the third and fourth jig parts 40c and 40d may be positioned to face each other and perpendicularly to the first and second jig parts 40a and 40b, i.e., to cover openings defined by the mounting grooves 41. Welding holes 42 may be formed through the third and fourth jig parts 40c and 40d at positions corresponding to the electrode terminals of the bare cells 30, e.g., the welding holes 42 may correspond to electrode portions of respective conductive tabs. A magnetic substance 43 may be provided on an entire inner surface, i.e., a surface facing the first and second jig parts 40a and 40b, of each of the third and fourth jig parts 40c and 40d. Accordingly, the magnetic portions 11 of the conductive tabs may be attached and fixed to the magnetic substance 43, as will be described in more detail below with reference to FIGS. 6 and 7.

Although not shown in this figure, in the jig 40 for welding, one side of the first, second, third and fourth jig parts 40a, 40b, 40c, and 40d may be joined to be rotatable. For example, one side of the first, second, third, and fourth jig parts 40a, 40b, 40c, and 40d may be joined into a hinge structure. Alternatively, protection or groove portions used to be joined with the third and fourth jig parts 40c and 40d may be formed at the first and second jig parts 40a and 40b, so that the first and second jig parts 40a and 40b may be joined with the third and fourth jig parts 40c and 40d.

FIG. 5 illustrates a perspective view of another embodiment of a forth jig part of FIG. 4. Referring to FIG. 5, a magnetic substance 43' may be provided on the fourth jig part 40d only at positions respectively corresponding to the magnetic portions 11, e.g., overlapping the magnetic portions 11 when assembled, of the conductive tabs on the inner surface of the fourth jig part 40d having welding holes 42' formed therein. Accordingly, the conductive tabs may be fixed to the fourth jig part 40d at more exact positions, so that the welding workability may be improved further. The third jig part 40c (see FIG. 4) may also be formed to have the magnetic substance 43' as the fourth jig 40c.

Figure 7:
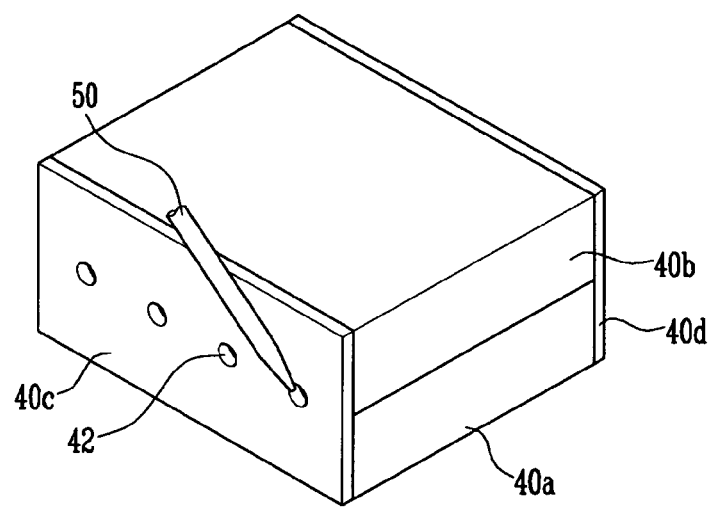
FIG. 7 illustrates a perspective view of welding an assembled jig shown in FIG. 6.

FIG. 6 illustrates an exploded perspective view of the bare cells 30 and respective conductive tabs in the jig 40 for welding according to an embodiment. FIG. 7 illustrates a perspective view of the conductive tabs welded to the bare cells 30 according to an embodiment.

Referring to FIGS. 6 and 7, the bare cells 30 may be mounted in the mounting grooves 41 of the first jig part 40a. The magnetic portions 11 of the conductive tabs 31, 32, 33, 34 and 35 may be fixed to inner surfaces of the third and fourth jig parts 40c and 40d, i.e., to the surfaces covered with the magnetic substance 43, at the positions corresponding to at least the conductive tabs 31, 32, 33, 34 and 35. For example, the outermost conductive tabs 31 and 35 may be fixed, i.e., in an unfolded state, at opposite ends of the third jig part 40c, and the conductive tab 33, i.e., to be positioned between the bare cells 30, may be fixed between the outermost conductive tabs 31 and 35, e.g., in the middle of the third jig part 40c. The conductive tabs 32 and 34, i.e., to be positioned between the bare cells 30, may be fixed to an inner surface of the fourth jig part 40d.

In this state, the second, third, and fourth jig parts 40b, 40c, and 40d may be joined with the first jig part 40a. Subsequently, welding may be performed with respect to the conductive tabs 31, 32, 33, 34 and 35, and the bare cells 30 by inserting a welding rod 50 (FIG. 7) into the jig 40 for welding through the welding holes 42 of the jig 40 for welding in the joined state. As described above, the magnetic portions 11 of the conductive tabs 31, 32, 33, 34, and 35 may be attached to the magnetic substances 43 of the jig 40 for welding, so that the bare cells 30 may be easily fixed to the jig 40 for welding. Accordingly, it may be possible to improve the welding workability of the jig 40 for welding with the bare cells 30.

Figure 8:
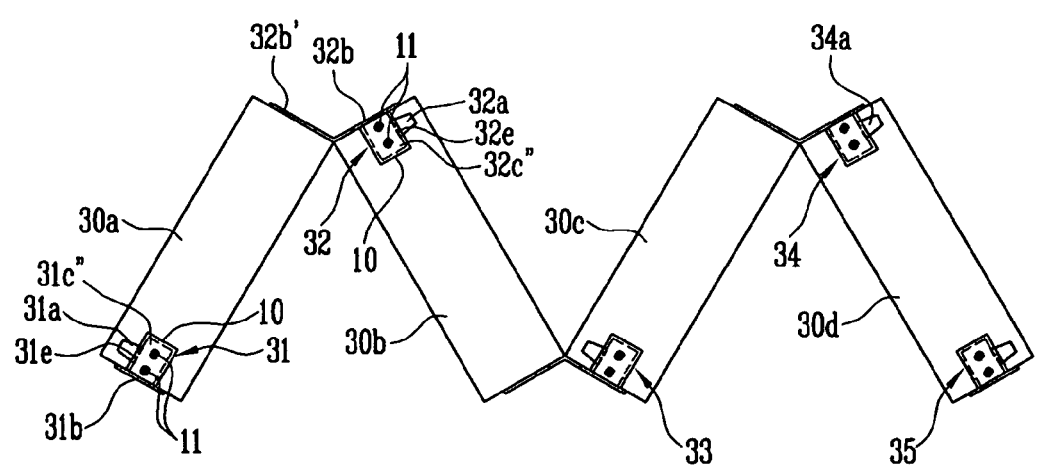
FIG. 8 illustrates a side view of conductive tabs welded to a plurality of bare cells according to an embodiment.

FIG. 8 illustrates a side view of the conductive tabs welded to the plurality of bare cells 30 according to an embodiment. Since not all components of the conductive tabs are shown in FIG. 8, FIG. 8 will be described with reference to FIGS. 2 and 3.

As shown in FIG. 8, when the welding of the bare cells 30 and the conductive tabs 31, 32, 33, 34 and 35 is complete, the bare cells 30a, 30b, 30c, and 30d may be removed from the jig 40 (see FIG. 4). Then, the conductive tabs 31, 32, 33, 34, and 35 welded to the bare cells 30a, 30b, 30c, and 30d may be folded along respective folding portions.

That is, the outermost conductive tab 31 may be folded along the first folding portion 31d, so that the second region 31c'' of the extension portion 31c is positioned at the side of the bare cell 30a. The joint portion 31a may be folded toward the PCM along the second folding portion 31e. The conductive tab 35 may be folded identically to the conductive tab 31.

Further, the conductive tab 32 positioned between the bare cells 30a and 30b may be folded along the first folding portion 32d, so that the second region 32c'' of the extension portion 32c is positioned at the side of the bare cell 30a. The joint portion 32a may be folded toward the PCM along the second folding portion 32e. The connection portion 32f may be folded along the third folding portion 32g, so that the two electrode portions 32b and 32b' may be positioned opposite to each other on respective bare cells 30b and 30a. Each of the conductive tabs 33 and 34 may be folded identically to the conductive tab 32.

Accordingly, the battery pack 100 according to an embodiment may be formed into a four-series (4S) structure in which four, e.g., cylindrical, bare cells 30 may be arranged in a line. Although the, e.g., cylindrical, battery pack with the 4S structure has been described as an example in the aforementioned embodiment, example embodiments may be applied to other battery packs with various serial and/or parallel structures.

Embodiments may provide a battery pack in which a magnetic portion is formed at one side of each non-magnetic conductive tab that connects adjacent bare cells or connects the bare cells and a protection circuit module, so that the conductive tabs can be easily fixed to a jig for welding, in which a magnetic substance is formed. As such, workability in the welding of the conductive tabs to the bare cells may be improved.

Embodiments may also provide a battery pack in which copper having excellent conductivity is used as a conductive tab. Therefore, it may be possible to stabilize the quality of a battery pack and to reduce material cost.

In contrast, when welding a plurality of conventional bare cells with respective conductive tabs in a jig, the conductive tabs may require various modifications to accommodate various shapes of bare cells, thereby requiring a complex technique to facilitate such welding without reducing welding workability. For example, a forcible inserting method may be used to weld non-magnetic conventional conductive tabs, i.e., conductive tabs having no magnetic portions, to the bare cells, thereby resulting in deformation of the conductive tab. In another example, welding may be used to attach conventional magnetic tabs formed of nickel (Ni), e.g., tabs made completely of nickel, to the bare cells, thereby reducing conductivity and increasing material costs.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of example embodiments as set forth in the following claims.

What is claimed is:

1. A battery pack, comprising:
at least one bare cell;
a protection circuit module (PCM) external to the at least one bare cell; and
at least one conductive tab connecting the at least one bare cell to the PCM, the conductive tab including a non-magnetic portion and a magnetic portion on a region of the non-magnetic portion,
wherein the conductive tab includes:
a first electrode portion connected to an electrode terminal of the bare cell,
an extension portion extending from the first electrode portion to a sidewall of the bare cell, the magnetic portion being only on the extension portion among portions of the conductive tab at a position corresponding to a magnetic substance in a jig for welding, and
a joint portion protruding from the extension portion to be connected to the PCM.

2. The battery pack of claim 1, wherein the magnetic portion is at a center of the extension portion.

3. The battery pack of claim 1, wherein the extension portion includes an insulating member.

4. The battery pack of claim 3, wherein the insulating member covers the magnetic portion.

5. The battery pack of claim 3, wherein the insulating member includes a polyimide (PI) film.

6. The battery pack of claim 1, wherein the extension portion includes a first region contacting the electrode terminal of the bare cell, and a second region contacting an outer surface of the bare cell, the magnetic portion being only on the second region.

7. The battery pack of claim 6, wherein the conductive tab further comprises a first folding portion between the first and second region and a second folding portion at a boundary between the extension portion and the joint portion, each of the first and second folding portions defining a non-straight angle.

8. The battery pack of claim 1, wherein the at least one bare cell includes at least first and second bare cells, and the at least one conductive tab includes at least first through third conductive tabs, at least the first conductive tab of the at least first through third conductive tabs connecting the at least first and second bare cells to each other and to the PCM.

9. The battery pack of claim 8, wherein at least the first conductive tabs further comprises a second electrode portion and a connection portion connecting the first and second electrode portions, the first and second electrode portions corresponding to the first and second bare cells.

10. The battery pack of claim 9, wherein at least the first conductive tabs further comprises a third folding portion in a middle of the connection portion, the first and second electrode portions being folded to completely overlap each other.

11. A method of forming a battery pack with at least one bare cell and a protection circuit module (PCM) external to the at least one bare cell, the method comprising:
   forming at least one conductive tab, the conductive tab including a non-magnetic portion and a magnetic portion on a region of the non-magnetic portion; and
   welding the conductive tab to the bare cell, such that the conductive tab connects the bare cell to the PCM,
   wherein the conductive tab includes:
      a first electrode portion connected to an electrode terminal of the bare cell,
      an extension portion extending from the first electrode portion to a sidewall of the bare cell, the magnetic portion being only on the extension portion among portions of the conductive tab at a position corresponding to a magnetic substance in a jig for welding, and
      a joint portion protruding from the extension portion to be connected to the PCM.

12. The method as claimed in claim 11, wherein forming the conductive tabs includes forming the magnetic portion by performing cladding with respect to the non-magnetic portion of the conductive tab.

13. The method as claimed in claim 11, wherein forming the conductive tabs includes adhering the magnetic portion to the non-magnetic portion of the conductive tab.

14. The battery pack of claim 1, wherein the extension portion is perpendicular to each of the first electrode portion and the joint portion, the first electrode portion and the joint portion being in perpendicular planes.

15. The battery pack of claim 14, wherein the first electrode portion, the extension portion, and the joint portion define the non-magnetic portion of the conductive tab, the magnetic portion being only on the extension portion of the non-magnetic portion.

16. The battery pack of claim 14, wherein the joint portion protrudes from a portion of the extension portion on the sidewall of the bare cell, the joint portion being inserted into a hole in the PCM.

17. The battery pack of claim 14, wherein the non-magnetic portion of the conductive tab includes copper.

18. The battery pack of claim 17, wherein the magnetic portion includes a magnet or a metal piece on the copper portion.

19. The battery pack of claim 18, wherein the metal piece includes pure iron or nickel.

* * * * *